United States Patent
Chung et al.

(10) Patent No.: US 11,736,308 B2
(45) Date of Patent: Aug. 22, 2023

(54) DEVICE AND METHOD FOR PROVIDING AUTOMATIC PARTICIPATION CHAT ROOM

(71) Applicant: INDUSTRY-ACADEMIC COOPERATION FOUNDATION, YONSEI UNIVERSITY, Seoul (KR)

(72) Inventors: Eui-Young Chung, Seoul (KR); Seong-Lyun Kim, Seoul (KR); Dae Hyung Cho, Seoul (KR); Sang Hyup Lee, Gyeongsangbuk-do (KR); Gi Lee, Seoul (KR); Tae Yang Jeong, Uiwang-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 194 days.

(21) Appl. No.: 17/280,019

(22) PCT Filed: Sep. 25, 2019

(86) PCT No.: PCT/KR2019/012435
§ 371 (c)(1),
(2) Date: Sep. 27, 2021

(87) PCT Pub. No.: WO2020/067708
PCT Pub. Date: Apr. 2, 2020

(65) Prior Publication Data
US 2022/0052864 A1    Feb. 17, 2022

(30) Foreign Application Priority Data
Sep. 28, 2018   (KR) ........................ 10-2018-0115597

(51) Int. Cl.
*H04L 12/18*  (2006.01)
*G06Q 30/0645*  (2023.01)

(52) U.S. Cl.
CPC ..... *H04L 12/1827* (2013.01); *G06Q 30/0645* (2013.01); *H04L 12/1818* (2013.01); *H04L 12/1822* (2013.01); *H04L 12/1831* (2013.01)

(58) Field of Classification Search
CPC ............. H04L 12/1827; H04L 12/1818; H04L 12/1822; H04L 12/1831; G06Q 30/0645
See application file for complete search history.

(56) References Cited

U.S. PATENT DOCUMENTS

| | | | |
|---|---|---|---|
| 2008/0162244 A1* | 7/2008 | Oral | G06Q 10/1095 705/7.19 |
| 2008/0219426 A1* | 9/2008 | Lai | H04M 3/382 379/202.01 |

(Continued)

FOREIGN PATENT DOCUMENTS

| | | |
|---|---|---|
| KR | 10-2014-0042647 A | 4/2014 |
| KR | 10-2014-0072362 A | 6/2014 |

(Continued)

OTHER PUBLICATIONS

International Search Report issued from PCT International Application No. PCT/KR2019/012435 dated Dec. 27, 2019.

*Primary Examiner* — John A Follansbee
*Assistant Examiner* — Raqiul A Choudhury

(57) ABSTRACT

A device for providing a location-based automatic participation chat room, the device, when a request to open a chat room is received along with service location information from at least one host terminal, creates at least one chat room, and sets a chat room identifier and a recognition code corresponding to each of the at least one chat room, and when at least one guest terminal accesses a location corresponding to the service location information using a pre-set participation means or the recognition code included in the (Continued)

participation means is received, makes the guest terminal participate in the chat room corresponding to the recognition code.

15 Claims, 18 Drawing Sheets

(56) References Cited

U.S. PATENT DOCUMENTS

| | | | | |
|---|---|---|---|---|
| 2010/0198646 A1* | 8/2010 | Mikan | ................ | G01C 21/3438 |
| | | | | 701/119 |
| 2012/0243673 A1* | 9/2012 | Carr | ................... | H04L 12/1818 |
| | | | | 379/202.01 |
| 2013/0239024 A1* | 9/2013 | Lewis | ................... | H04N 7/147 |
| | | | | 715/756 |
| 2014/0313282 A1* | 10/2014 | Ma | ....................... | H04N 7/141 |
| | | | | 348/14.09 |
| 2015/0039357 A1* | 2/2015 | Segal | .............. | G06Q 10/06314 |
| | | | | 705/5 |
| 2016/0134428 A1* | 5/2016 | Ouyang | ................. | H04L 69/24 |
| | | | | 709/204 |
| 2016/0323330 A1* | 11/2016 | Holst | .................. | H04L 12/1822 |
| 2016/0364368 A1* | 12/2016 | Chen | ...................... | H04L 51/216 |
| 2019/0236554 A1* | 8/2019 | Hill | ........................ | G06Q 10/06 |

FOREIGN PATENT DOCUMENTS

| | | |
|---|---|---|
| KR | 10-2015-0077481 A | 7/2015 |
| KR | 10-1869486 B1 | 6/2018 |

* cited by examiner

FIG. 6

FIG. 7 general restaurant

| | guest No. 1 | guest No. 2 | guest No. 3 |
|---|---|---|---|
| restaurant name | restaurant name | restaurant name | |
| Kimchi stew — 7000₩ | Soybean Paste Stew — 7000₩ | Gimbap — 5000₩ | |
| Sweet and sour pork — 8900₩ | Pork cutlet — 7900₩ | Ramen — 6000₩ | |
| Seafood soup — 10000₩ | Champon — 6000₩ | Red Bean Porridge — 6000₩ | |
| Side dish | Side dish | Side dish | |
| Order / Pay / Receipt / Chat | Order / Pay / Receipt / Chat | Order / Pay / Receipt / Chat | | table No. 1 — guest No. 1, guest No. 2
table No. 2 — guest No. 3

Open Talk Everywhere!    Margo counter

Order | Pay | Receipt | Chat

FIG. 9 general restaurant

Open Talk Everywhere!  |  Margo

| | | | |
|---|---|---|---|
| Order | Pay | Receipt | Chat | counter order status — guest No. 1 (table No. 1)

| menu | | person | |
|---|---|---|---|
| Price | Item | Qty | |
| 6000 | Ramen | 1 | |
| 6000 | Red Bean Porridge | 1 | | change my order
confirm order : 6000₩

| Order | Pay | Receipt | Chat |
|---|---|---|---| order status — guest No. 2 (table No. 1)

| menu | | person | |
|---|---|---|---|
| Price | Item | Qty | |
| 6000 | Ramen | 1 | |
| 6000 | Red Bean Porridge | 1 | | change my order
confirm order : 6000₩

| Order | Pay | Receipt | Chat |
|---|---|---|---| restaurant name — guest No. 3 (table No. 2)

| | |
|---|---|
| Gimbap | 5000₩ |
| Ramen | 6000₩ |
| Red Bean Porridge | 6000₩ |
| Side dish | |

Order

| Order | Pay | Receipt | Chat |
|---|---|---|---|

FIG. 10 general restaurant

Open Talk Everywhere!  | Margo

*counter*
Order | Pay | Receipt | Chat

| order status | | |
|---|---|---|
| menu | person | |
| Price | Item | Qty |
| 6000 | Ramen | 1 | change my order
confirm order : 6000₩

Order | Pay | Receipt | Chat

*guest No. 1*

| order status | | |
|---|---|---|
| menu | person | |
| Price | Item | Qty |
| 6000 | Red Bean Porridge | 1 | change my order
confirm order : 6000₩

Order | Pay | Receipt | Chat

*guest No. 2*

⌐ table No. 1

| restaurant name | |
|---|---|
| Gimbap | 5000₩ |
| Ramen | 6000₩ |
| Red Bean Porridge | 6000₩ |
| Side dish | |

Order

Order | Pay | Receipt | Chat

*guest No. 3*

⌐ table No. 2

FIG. 11 general restaurant

Open Talk.Everywhere! | Margo

| | | order status | | | | order status | | | | order status | | |
|---|---|---|---|---|---|---|---|---|---|---|---|---|---|
| | menu | person | | | menu | person | | | menu | person | | | |
| | Price | Item | Qty | | Price | Item | Qty | | Price | Item | Qty | | |
| | 6000 | Ramen | 1 | | 6000 | Ramen | 1 | | 7000 | Soybean Paste Stew | 1 | | |
| | 6000 | Red Bean Porridge | 1 | | 6000 | Red Bean Porridge | 1 | | | | | | |
| change my order | | | | change my order | | | | change my order | | | | | |
| confirm order 12000₩ | | | | confirm order 12000₩ | | | | confirm order 7000₩ | | | | | |
| Order | Pay | Receipt | Chat | Order | Pay | Receipt | Chat | Order | Pay | Receipt | Chat | | | guest No. 1  guest No. 2  guest No. 3

⌐ table No. 1 ⌐  table No. 2

| Order | Pay | Receipt | Chat |
|---|---|---|---| counter

FIG. 12 general restaurant

Open Talk: Everywhere! | Margo

Margo | table No. 1 order :
1 Ramen, 1 Red Bean Porridge,
total 12000 won

Your order has been completed.
Please wait a moment.

[Make a payment]

| Order | Pay | Receipt | Chat | guest No. 1

| order status | | person |
|---|---|---|
| menu Price | Item | Qty |
| 6000 | Ramen | 1 |
| 6000 | Red Bean Porridge | 1 | change my order
confirm order : 12000 w

| Order | Pay | Receipt | Chat | guest No. 2

⌐ table No. 1 ┘

| order status | | person |
|---|---|---|
| menu Price | Item | Qty |
| 7000 | Soybean Paste Stew | 1 | change my order
confirm order : 7000 w

| Order | Pay | Receipt | Chat | guest No. 3
table No. 2 counter

| Order | Pay | Receipt | Chat |

FIG. 16 general restaurant counter

Open Talk Everywhere! | Margo

- Margo — table No. 1 order :
  1 Ramen, 1 Red Bean Porridge, total 12000 won
- Margo — table No. 2 order :
  1 Soybean Paste Stew, total 7000 won
- Margo — table No. 1 :
  !Please bring some pickled radish here.
- Margo — table No. 2 :
  !A glass of water, please.

Order | Pay | Receipt | Chat

--- guest No. 1 — table No. 1

Amount to pay : 6000

| Easy payment | Counter payment |

Card payment
Payco
Mobile phone micro payment
Deposit without bankbook

Cancel

Order | Pay | Receipt | Chat

--- guest No. 2 — table No. 1

Amount to pay : 6000

| Easy payment | Counter payment |

Card payment
Payco
Mobile phone micro payment
Deposit without bankbook

Cancel

Order | Pay | Receipt | Chat

--- guest No. 3 — table No. 2

Open Talk Everywhere! | Margo

!A glass of water, please.

Order | Pay | Receipt | Chat

FIG. 17 general restaurant

| Open Talk Everywhere! | Margo |

Margo: table No. 1 order :
1 Ramen, 1 Red Bean Porridge,
total 12000 won

Margo: table No. 2 order :
1 Soybean Paste Stew, total 7000 won

Margo: table No. 1 :
1 Please bring some pickled radish here.

Margo: table No. 2 :
1 A glass of water, please.

Margo: At table No. 1
guest No. 1 paid 6000 won.

Margo: At table No. 1
guest No. 2 paid 6000 won.

| Order | Pay | Receipt | Chat | counter

---

Amount to pay :
You paid 6000 won
with a mobile phone
micro payment.

| Order | Pay | Receipt | Chat | guest No. 1

---

Amount to pay :
You paid 6000 won
by credit card.

| Order | Pay | Receipt | Chat | guest No. 2

⌐ table No. 1 ⌐

---

Open Talk Everywhere!
Margo
1 A glass of water, please.

| Order | Pay | Receipt | Chat | guest No. 3 table No. 2

FIG. 18 general restaurant

| Open Talk Everywhere! | Margo |

Margo  table No. 1 order :
       1 Ramen, 1 Red Bean Porridge,
       total 12000 won Margo  table No. 2 order :
       1 Soybean Paste Stew, total 7000 won Margo  table No. 1 :
       !Please bring some pickled radish here.

Margo  table No. 2 :
       !A glass of water, please.

Margo  At table No. 1
       guest No. 1 paid 6000 won.

Margo  At table No. 1
       guest No. 2 paid 6000 won.

Margo  At table No. 2
       guest No. 3 paid 7000 won.

| Order | Pay | Receipt | Chat | counter

---

Amount to pay :
You paid 6000 won
with a mobile phone
micro payment.

| Order | Pay | Receipt | Chat | guest No. 1

Amount to pay :
You paid 6000 won
by credit card.

| Order | Pay | Receipt | Chat | guest No. 2

⌐ table No. 1 ⌐

Amount to pay :
You paid 7000 won
with Payco.

| Order | Pay | Receipt | Chat | guest No. 3 table No. 2

DEVICE AND METHOD FOR PROVIDING AUTOMATIC PARTICIPATION CHAT ROOM

CROSS-REFERENCE TO RELATED APPLICATIONS

This application is a National Stage Entry of PCT International Application No. PCT/KR2019/012435, which was filed on Sep. 25, 2019, and which claims priority from and the benefit of Korean Patent Application 10-2018-0115597, filed with the Korean Intellectual Property Office on Sep. 28, 2018. The disclosure of the above patent application is hereby incorporated by reference in its entirety.

BACKGROUND

1. Technical Field

The present disclosure relates to a device and a method for providing a chat room, more particularly to a device and a method for providing a location-based automatic participation chat room that makes it possible to automatically participate in a chat room by means of a pre-designated participation means.

2. Description of the Related Art

Recently, due to the expansion of the spread of smart devices, changes are also occurring in chat services. Existing chat services provided services mainly based on a conversation partner list only, but as location information can be obtained using smart devices, it became possible to provide a chat service based on location information.

The location-based chat service may group users in a specific region or location as conversation partners to perform a conversation, so that offline meetings, conferences or the like of users in the corresponding region or location can be smoothly performed.

However, in the case of the existing location-based chat service, it is designed such that, if a partner already included in the conversation partner list moves within a designated location range, it involves the partner in conversation, so it is not easy to involve in the chat room a partner who is not included in the conversation partner list. In other words, even with a location-based chat service, there is a limitation in that a conversation partner has to be added to the list first, and a conversation is possible only if the added conversation partner is invited to the chat room.

In addition, since the chat room is composed of a single structure, conversation participants in the chat room can only conduct simple chatting. That is, chatting was performed while all the conversation participants within the corresponding location shared the conversation contents in a single chat room. Due to this, in order for some conversation participants to conduct a separate conversation, they not only had to open a new chat room, but also had the inconvenience of having to alternately conduct a chat through a plurality of chat windows displayed separately for each chat room.

Meanwhile, there have also been attempts to apply the location-based chat service to visitor service. Here, the visitor service refers to a service for visitors gathered in a specific place, such as a service for customers in a store or participants in a conference.

FIG. 1 is a diagram for explaining an example of applying a location-based chat service to a visitor service.

In FIG. 1, as an example, it is assumed that a plurality of guests are distributed and grouped in one building offline. This is a situation frequently seen in hotels, conferences, conventions, forums and various exhibitions, and a plurality of guests can be grouped into different groups to participate according to exhibition booths, lecture halls, or individual interests or purposes. Although in FIG. 1, for the convenience of understanding, it is divided into a number of rooms, which are closed spaces that are clearly separated from each other in the building at the same location, but it is not limited thereto. That is, each of the plurality of rooms shown in FIG. 1 may be a virtual group formed by gathering guests in a booth, table or the like where guests are divided according to their interests, rather than a space divided into physical partition units.

If a plurality of guests are grouped into a plurality of groups in this way, the guests participating in each group basically require that a chat service be provided between the guests in the group having the same topic or purpose. In other words, the guests want to avoid confusing the conversation content displayed in the chat window due to the inflow of conversation contents of other groups conducting conversations on different topics or purposes.

However, since the existing location-based chat service providing method simply creates a chat room based only on location information, each group cannot be divided. Therefore, when a plurality of guests in the same place want to chat in groups, there is a limitation in that a separate chat service cannot be provided. That is, a plurality of guests located in the same location (here, the same building) are not divided into multiple groups, but belong to one single chat room, which causes a problem that the conversation of guests with different interests to be performed in a single chat window.

In particular, as shown in FIG. 1, when a plurality of guests are all included within a network range of a single base station BS1, it is more difficult to distinguish a plurality of guest groups. Accordingly, in order for the guests of each group to perform intra-group chatting, a chat room must be created by individually adding conversation partners to the chat list. In addition, even when a chat room of an individual guest group is created, there is an inconvenience in that each guest who wants to participate in the chat has to distinguish between multiple chat rooms created for each group and participate.

In addition, there is a limitation in that the host (here, as an example, an event organizer) cannot determine which guest group each of a plurality of guests belongs to. This makes it impossible for the host to easily make a guest call, emergency contact, and the like, as it is not possible to distinguish a guest group including a specific guest from among a plurality of guests.

Meanwhile, in some cases, a plurality of base stations BS2 may be provided corresponding to each of a plurality of guest groups. In this case, a plurality of guest groups can be easily distinguished by the network range of each of the plurality of base stations BS2. 5G networks or the like, which have recently become an issue, use millimeter wave signals, so the network range is not only narrow but also easily blocked by obstacles such as walls. Accordingly, the network range of the plurality of base stations BS2 is limited to the range of each room, and it is possible to easily distinguish the guest groups.

However, although the above limitation of the network range is effective when each guest group is partitioned by a real obstacle such as a wall, but if not partitioned by an obstacle, there is a limitation in that the network ranges overlap, so that the distinction between the guest groups is not clear. In addition, there is a problem in that it is not easy for each guest to have a conversation with a host higher than the guest group.

That is, even in case of attempting to apply the location-based chat service to the visitor service, it was not possible to distinguish each visitor group, so that, as described above, there was an inconvenience in that some conversation participants had to open a new chat room in order to conduct a separate conversation.

SUMMARY OF THE INVENTION

An object of the present disclosure is to provide a device and a method for providing a location-based automatic participation chat room in which a user of a specific place or location can easily participate in at least one chat room prepared in advance.

Another object of the present disclosure is to provide a device and a method for providing a location-based automatic participation chat room that allows various services to be provided to visitors using the chat room.

Another object of the present disclosure is to provide a device and a method for providing a location-based automatic participation chat room that can simply perform chatting with another chat room without moving chat windows.

Another object of the present disclosure is to provide a device and a method for providing a location-based automatic participation chat room that can provide in-store ordering for customers, handling of service requests, and payment services by using the chat room.

A device for providing a location-based automatic participation chat room according to an embodiment of the disclosure, conceived to achieve the objectives above, creates at least one chat room if a request to open a chat room is received from at least one host terminal along with service location information, and sets a chat room identifier and a recognition code corresponding to each of the at least one chat room, and if at least one guest terminal accesses a location corresponding to the service location information using a preset participation means or the recognition code included in the participation means is received, can make the guest terminal participate in the chat room corresponding to the recognition code.

If a conversation is transmitted from at least one guest terminal or host terminal, the device for providing a location-based automatic participation chat room may filter whether the chat room identifier is included, if the chat room identifier is not included, the device may forward the transmitted conversation to other guest terminals and host terminals participated in the same chat room, and if the chat room identifier is included, the device may forward the transmitted conversation to other guest terminals and host terminals participated in the chat room corresponding to the chat room identifier.

If a chat room setting command is applied together with a chat room opening request from the at least one host terminal, the device for providing a location-based automatic participation chat room may create a plurality of chat rooms in response to the chat room setting command, or create hierarchical chat rooms including an upper chat room and at least one lower chat room corresponding to the upper chat room, and designate a chat room identifier and a recognition code corresponding to each of the created chat rooms.

If a conversation is transmitted from at least one guest terminal or host terminal participating in the lower chat room, the device for providing a location-based automatic participation chat room may filter whether the pre-designated upper conversation command is included, if the conversation command is not included, the device may transfer the transmitted conversation to other guest terminals and host terminals participated in the same chat room, and if the conversation command is included, the device may transfer the transmitted conversation to other guest terminals and host terminals participated in the upper chat room.

The device for providing a location-based automatic participation chat room may receive the location information of each of the at least one guest terminal, determine whether the service location information is included within a pre-designated detection range from the received location information, deliver a chat room list for a chat room corresponding to the determined service location information to the at least one guest terminal, and, if a selection signal for a chat room of the chat room list is received from the at least one guest terminal, make the guest terminal participate in the selected chat room.

In response to a service menu setting command applied from the host terminal, the device for providing a location-based automatic participation chat room may additionally create and store a service menu screen to be transmitted to the guest terminal, and if a service menu call command is applied from the at least one guest terminal, the device may deliver the service menu screen including at least one service information, and if a service selection signal for at least one service included in the service menu screen is received from the at least one guest terminal, the device may deliver the selected service information together with the chat room identifier to the host terminal.

When a payment request is received from the at least one guest terminal, the device for providing a location-based automatic participation chat room may pay a fee corresponding to the selected service information.

When at least one guest terminal participating in the chat room deviates from the service provision range designated for each chat room, the device for providing a location-based automatic participation chat room may excludes the deviated guest terminal from the chat room, and if all guest terminals participating in the chat room deviate from the service provision range, the device may initialize the chat room.

A method for providing a location-based automatic participation chat room according to another embodiment of the disclosure, conceived to achieve the objectives above, includes the steps of: when a chat server receives a request to open a chat room together with service location information from at least one host terminal, creating at least one chat room, and setting a chat room identifier and recognition code corresponding to each of the at least one chat room; when at least one guest terminal accesses a location corresponding to the service location information using a preset participation means or the recognition code is received from the at least one guest terminal, making the guest terminal participate in a corresponding chat room among the at least one chat room; and transmitting a conversation inputted to the at least one host terminal or a conversation inputted to the at least one guest terminal.

Therefore, the device and method for providing a location-based automatic participation chat room according to an embodiment of the present disclosure makes it possible to automatically or easily participate in at least one chat room prepared in advance by a host by using a pre-designated participation means, irrespective of a conversation partner list. In addition, the convenience of a chat service user can be maximized by allowing the user to easily move amongst a plurality of chat rooms without moving chat windows. In addition, the host can provide various services to visitors by using chart rooms. In addition, if the location information is location information about a store, the host can chat with guests in multiple chat rooms in a single chat window to provide the guests with various convenience services, such as in-store ordering for customers, handling of service requests, and payment services. That is, the guest can request a service from the host without unnecessary movement or physical call, and can pay for it, and the host can provide the service requested by the guest without misunderstanding or forgetting it.

BRIEF DESCRIPTION OF THE DRAWINGS

FIG. 6 to FIG. 18 show actual operation examples of a device and method for providing a location-based automatic participation chat room according to an embodiment of the present disclosure.

DETAILED DESCRIPTION OF THE INVENTION

Figure 1:
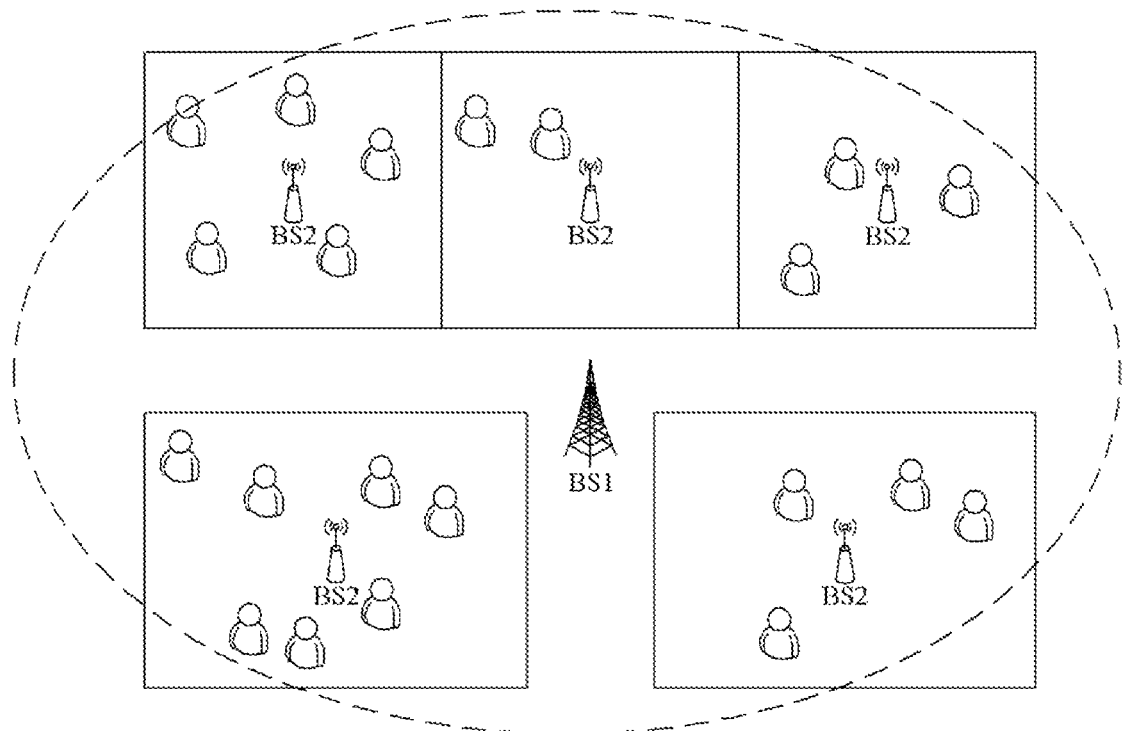
FIG. 1 is a diagram for explaining an example of applying a location-based chat service to a visitor service.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the disclosure can be implemented in various different forms and is not limited to the embodiments described herein. For a clearer understanding of the disclosure, parts that are not of great relevance to the disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 2:
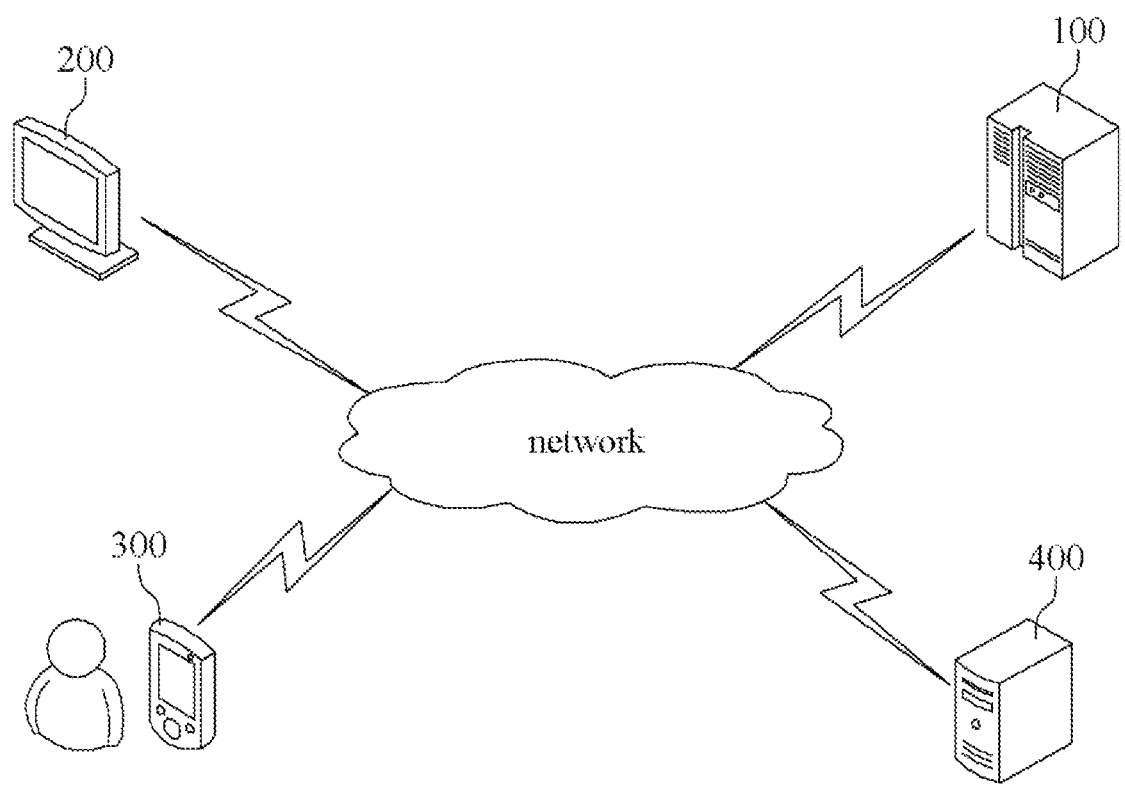
FIG. 2 shows a schematic structure of a location-based automatic participation chat room providing system according to an embodiment of the present disclosure.

FIG. 2 shows a schematic structure of a location-based automatic participation chat room providing system according to an embodiment of the present disclosure.

A system for providing an automatic participation chat room according to this embodiment includes a chat server 100, at least one host terminal 200 and at least one guest terminal 300.

The at least one host terminal 200 requests the chat server 100 to create a location-based chat room. The host terminal 200 first accesses the chat server 100, performs host authentication, and requests to open a chat room together with service location information, which is location information on a place to provide a chat service. Here, the service location information may include at least one of GPS information and WIFI information, but is not limited thereto.

Then, when the chat room opening is approved in the chat server 100, it opens at least one chat room. Here, a chat room may be opened with designation of a corresponding identifier, and multiple chat rooms may be opened. In addition, it may be opened to have a hierarchical structure. The chat room of a hierarchical structure may be opened with the number of lower chat room for at least one upper chat room and identifiers for the upper chat room and the lower chat room and the like set together.

In this embodiment, the upper chat room means a chat room in which the guests of the lower chat room can chat with the host, but is not limited thereto, and it may refer to a chat room in which guests entering the lower chat room can chat regardless of the classification of the lower chat room. In addition, if there are a plurality of host terminals 200 corresponding to the upper chat room, it may be a chat room in which the hosts of the plurality of host terminals 200 can perform a conversation.

The host terminal 200 sets a participation means so that the guest can easily participate in the opened chat room. Here, the participation means may include a recognition code for entering the chat room, for example, it may be set with a network identifier such as WIFI, a QR code, or NFC (Near Field Communication), or the like, and, in some cases, GPS information may be included. However, the present disclosure is not limited thereto.

The participation means allows the guest terminal to immediately participate in the chat room according to the recognition code. In addition, if there are multiple chat rooms or if the chat room is of a hierarchical structure, it allows to directly participate in a specific chat room among the multiple chat rooms or a designated chat room among upper and lower chat rooms.

The host terminal 200 may display a conversation inputted to other host terminals or guest terminals 300 participating in the chat room after being authorized from the chatting server 100. In particular, in this embodiment, the host terminal 200 may receive authorization for a conversation inputted with a chat room identifier in each chat room divided into multiple chat rooms or hierarchical chat rooms, and display it in one chat window. That is, when the host terminal 200 or the guest terminal 300 participating in another chat room inputs a conversation together with an identifier corresponding to the chat room in which the host terminal 200 participates in the chat window, it is displayed. In this case, the host terminal 200 may display the contents of the conversation together with the chat room identifier in which the conversation was entered, so that the host can identify the chat room from which the conversation was transmitted.

In addition, when a conversation is inputted with the chat room identifier, the host terminal 200 transmits it to the chat server 100 so that the chat server 100 transmits the content of the conversation to the chat room corresponding to the chat room identifier.

In addition, the host terminal 200 may set a service menu to be provided to the guest in the chat server 100. The service menu may be set in various forms as information on services that the host can provide to guests. When a service selection signal is received from the guest terminal 300 via the chatting server 100, the host terminal 200 may display a service corresponding to the service selection signal.

Additionally, in some cases, the host terminal 200 may also transmit a payment approval request to the chat server 100 for a service used by the guest.

The host terminal 200 may also be implemented as a portable smart device, but is not limited thereto. That is, the host terminal 200 may be a general user terminal such as a PC, a notebook computer or the like, and in some cases may be a point of sales (POS) device.

In this embodiment, the chat server 100, as a device for providing a location-based automatic participation chat room, creates location-based hierarchical chat rooms in response to a request of at least one host terminal 200. The chat server 100 performs host authentication when at least one host terminal 200 is accessed. When the host is authenticated, the chat server 100 may create at least one chat room according to the chat room opening request of the host terminal 200. In this case, the chat server 100 may create multiple chat rooms, as described above, or may also create a chat room of a hierarchical structure.

When the chat room opening request is received together with the service location information from the host terminal 200, the chat server 100 checks whether a chat room has been previously opened for the same service location information. If there is no chat room opened, the chat room opening is approved, and if there is already a chat room opened from the same service location information, it is determined whether the chat room is opened by the same host or by another host.

The chat server 100 may notify the host terminal 200 that a chat room corresponding to the corresponding service location information has already been opened by the same host or another host, and, after checking whether to additionally open a chat room in the same location, create location-based hierarchical chat rooms.

In addition, the chat server 100 may designate the number of chat rooms and the hierarchical structure and an identifier for each chat room and the like according to the chat room setting applied from the host terminal 200, thereby opening the chat room(s). In this case, the chat server 100 may receive and set together the participation means for each of the at least one chat room designated by the host terminal 200.

In addition, when a service menu setting command is applied from the host terminal 200, the chat server 100 may configure a service menu screen in response to the service menu setting command.

The chat server 100 determines whether the guest terminal 300 is accessed by recognizing the participation means. If the guest terminal 300 is accessed by recognizing the participation means, it makes the guest terminal 300 immediately enter the chat room corresponding to the recognized participation means. At this time, even if multiple chat rooms are opened or hierarchical chat rooms are opened, the chat server 100 may make the guest terminal enter directly into a specific chat room. Even if having a hierarchical structure with an upper chat room and a plurality of lower chat rooms, if the participation means corresponds to the lower chat rooms, the chat server 100 makes the guest terminal 300 immediately enter the corresponding chat room, without going through a list of the upper chat room or lower chat rooms.

For example, when the guest terminal 300 accesses to a network designated as a participation means, or recognizes a QR code or an NFC tag and the recognition code is delivered, the chat server 100 make the guest terminal 300 immediately participate in the chat room corresponding to the recognition code. At this time, if the location-based automatic participation chat app is not executed in the guest terminal 300, the chat server 100 may transmit an app execution request to the guest terminal 300 to execute the location-based automatic participation chatting app in the guest terminal 300. Accordingly, it maximizes the convenience of participating in the chat room of the guest terminal 300.

Meanwhile, if the guest terminal 300 is accessed without using a participation means, the chat server 100 receives and confirms the location information of the guest terminal 300. In addition, it analyzes chat rooms opened within a pre-designated detection range from the current location of the guest terminal 300, and transmits the analyzed chat room information to the guest terminal 300, thereby notifying the guest of the existence of a chat room opened by the host in the vicinity. In this case, if there is a chat room(s) within the detection range from the guest terminal 300, the chat server 100 transmits a list of the chat room(s) to the guest terminal 300. Here, the transmitted list of chat rooms may be a list of all chat rooms that can be participated in, however in case of hierarchical chat rooms, it may also be a list of upper chat rooms.

When a chat room selection signal for one of the chat rooms displayed in the chat room list is applied from the guest terminal 300, the chat server 100 approves participation in the corresponding chat room of the guest terminal 300. If a selection signal for the upper chat room of the hierarchical chat rooms is applied, the chat server 100 additionally transmits a list of at least one lower chat room corresponding to the selected upper chat room to the guest terminal 300, and if a lower chat room selection signal for the lower chat room list is applied, the chat server makes the guest terminal 300 participate in the lower chat room. That is, it can make a chat window of the lower chat room be displayed on the guest terminal 300.

Meanwhile, the chat server 100 transfers conversations inputted into the chat window of the host terminal 200 or the guest terminal 300 to the other host terminal 200 or guest terminal 300 having entered the participated chat room. In particular, when a conversation is inputted with a pre-designated chat room identifier into the chat window of the host terminal 200 or guest terminal 300 of each chat room, the chat server 100 according to this embodiment transmits the inputted conversation to the host terminal 200 or guest terminal 300 of the chat room corresponding to the identifier of the chat room. That is, it allows to forward or receive conversations to other chat rooms in one chat window without using multiple chat windows, without distinction of chat room. The same can be applied to hierarchical chat rooms.

In addition, when a service menu call command is applied from the guest terminal 300, the chat server 100 may transmit and display the set service menu screen to the guest terminal 300, and when a service selection signal is applied from the guest terminal 300, deliver the selected service selection information together with the chat room identifier to the host terminal 200, thereby allowing the host to recognize the chat room that requested the service and provide the service.

Meanwhile, the chat server 100 analyzes the location information of at least one guest terminal 300 entered into the chat room, and, if it is determined that the guest terminal 300 of the chat room is out of a pre-designated service provision range from the service location information set in the chat room, it does not transmit conversations to the corresponding guest terminal 300. That is, it excludes the guest terminal 300 from the chat room. Here, if the chat room has a hierarchical structure, the chat server 100 may exclude the guest terminal 300 not only from the lower chat rooms but also from the upper chat room.

Here, the service provision range may be a pre-set distance range (for example, 20 m) from a location (for example, a GPS location) designated in the service location information, and may be a range of reach of WIFI designated in the service location information, or the like.

In addition, if it is determined that all guest terminals 300 of the chat room are excluded, the chat server 100 may initialize or delete the chat room. This is because even if a guest terminal 300 enters the chat room of the same identifier at the same location afterward, the guest of the entered guest terminal 300 and the guest of the guest terminal 300 who performed the previous chatting can be regarded as irrelevant.

Additionally, when a payment request is applied from the host terminal 200 or the guest terminal 300, the chat server 100 approves the payment. In some cases, the system for providing an automatic participation chat room may further include a payment server 400 separate from the chat server 100, as shown in FIG. 2. If the payment server 400 is included separately, the chat server 100 transmits a payment request applied from the host terminal 200 or the guest terminal 300 to the payment server 400, and when payment is approved by the payment server 400, it may transmit the approval result to the host terminal 200 or the guest terminal 300.

In this embodiment, if there is a participation means, such as a network, QR code or NFC tag, prepared in advance by the host, the guest terminal 300 may recognize this and access or transmit to the chat server 100, thereby directly entering a specific chat room. That is, the guest terminal 300 may recognize the participation means and directly enter the chat room, without transmitting location information to the chat server 100, or without selecting one chat room from the chat room list.

At this time, it does not matter if the location-based automatic participation chat app is not running at the guest terminal 300, and if the location-based automatic participation chat app is not running, the guest terminal 300 executes the automatic participation chat app, in response to an app execution request applied from the chatting server 100.

Accordingly, by recognizing the participation means in the guest terminal 300, the guest can easily enter the required chat room.

Additionally, the participation means may be set with GPS location information. If the participation means is set with GPS location information, when the guest terminal 300 approaches the designated location, it may automatically enter the corresponding chat room.

Meanwhile, each of the at least one guest terminal 300 accesses the chat server 100, and transmits location information to the chat server. Here, it is assumed that the guest terminal 300 has a location-based automatic participation chat app previously installed and executed. However, the present embodiment is not limited thereto.

The guest terminal 300 may receive a list of nearby chat rooms based on location information and display it. If a selection command is applied for at least one chat room list among the displayed chat room list, a guest can select a chat room to enter from among at least one nearby chat rooms. The chat room selected here is an upper chat room, and the guest terminal 300 may additionally receive lower chat room lists from the chat server 100 and display it, and may enter the lower chat room by selecting one of the lower chat room lists.

Meanwhile, the guest terminal 300 having entered the chat room displays a chat window to the guest. In this case, a service menu call item may be displayed together in the chat window.

When the service menu call item is selected, the guest terminal 300 may receive service menu screen pre-set for the corresponding chat room from the chat server 100 and display it. In addition, when a service selection command is applied for at least one service on the service menu screen, it transmits a service selection signal to the chat server 100.

In addition, the guest terminal 300 may transmit a payment request to the chat server 100. In this case, the guest terminal 300 may check the service cost provided from the chat server 100, and transmit a payment request for the service provided from the host to the chat server 100.

The above-described service menu screen display and payment request may be applied when the system for providing a location-based automatic participation chat room is used for commercial purposes, such as restaurants or hotels, rather than simply providing a chat service.

Currently, most offline stores employ staff to process orders and payments, or they are making efforts to automate and save labor costs by installing a separate POS machine. However, despite these efforts, customers are experiencing inconvenience due to the long waiting times for orders and payments. Accordingly, as in the present embodiment, if the chat server 100 can provide a service menu screen in response to a service menu call command applied from the guest terminal 300, and perform payment in response to a payment request, guests will be able to freely request services and settle costs without unnecessary movement or physically calling the host.

In addition, even when the guest wants to make a separate request that is not displayed as a service menu to the host, the request can be transmitted to the host simply by using the chat room identifier. For example, if the guest is aware of the identifier of the chat room in which the host terminal 200 is participating, the guest can easily transmit a request to the host, by inputting a conversation together with the chat room identifier in the chat window of the guest terminal 300. However, for this, the guest must be previously aware of the identifier of the chat room in which the host terminal 200 is participating. Accordingly, as described above, by configuring the chat rooms in a hierarchical structure of the upper chat room and the lower chat rooms, and configuring the host terminal 200 to always participate in the upper chat room, it can make it possible for the guests to easily recognize the chat room in which the host terminal 200 is participating.

In addition, since the guest's service selections and requirements are recorded sequentially in one chat window, the host can respond to the guest's service selections and requirements without misunderstanding or forgetting.

Figure 3:
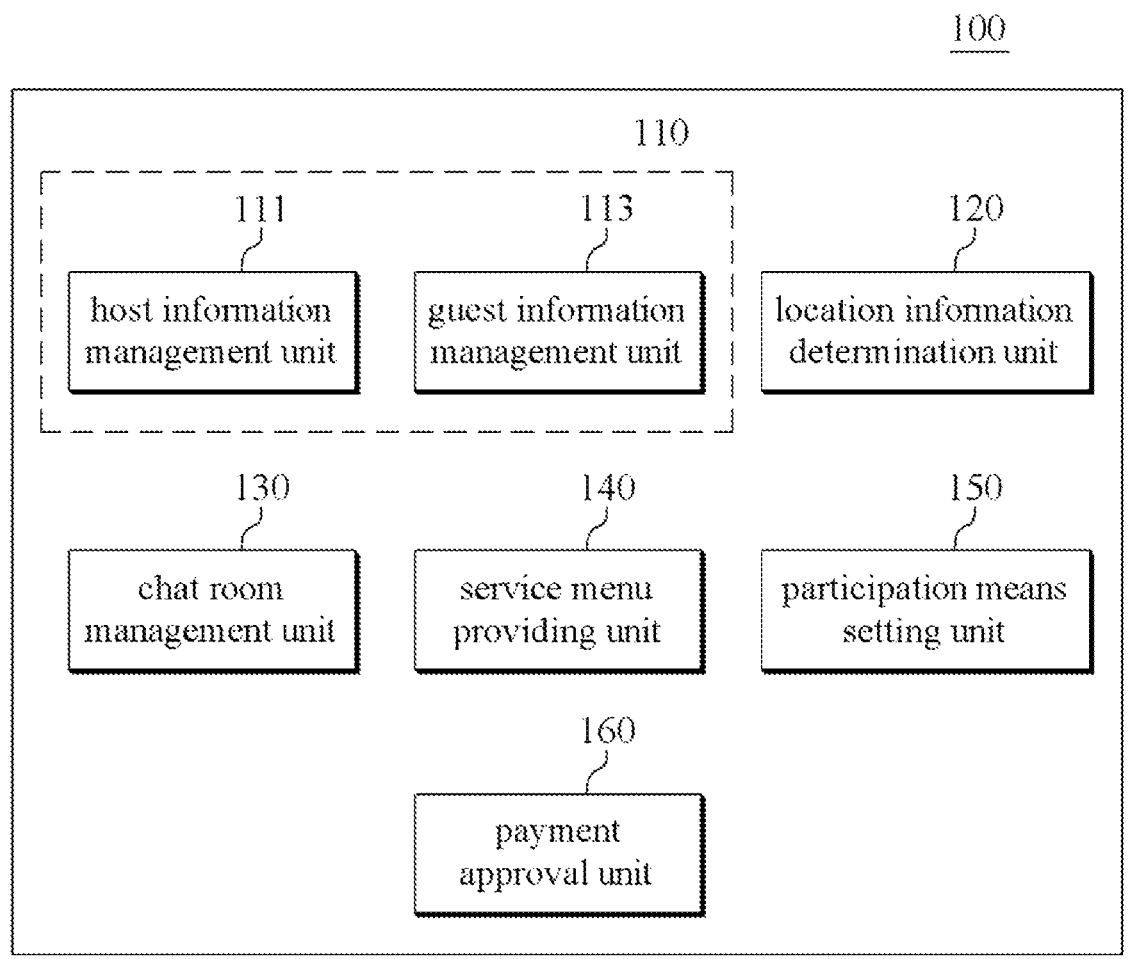
FIG. 3 shows a schematic configuration of the chat server of FIG. 2.

FIG. 3 shows a schematic configuration of the chat server of FIG. 2.

Referring to FIG. 3, the chat server 100 according to the present embodiment may include a user information management unit 110, a location information determination unit 120, a chat room management unit 130, a service menu providing unit 140, a participation means setting unit 150 and a payment approval unit 160.

The user information management unit 110 manages user information, i.e. host information and guest information, and may include a host information management unit 111 and a guest information management unit 113.

The host information management unit 111 stores information of a host who wants to create a location-based hierarchical chat room. The host information management unit 111 may store information on previously joined hosts. In addition, if a host authentication request is received from the host terminal 200, the host information management unit 111 performs host authentication according to the stored host information. If a request for opening a chat room is received from the host terminal 200 through host authentication, the host information management unit 111 may approve the chat room opening and notify the chat room management unit 130.

In addition, the host information management unit 100 may match a plurality of host information to at least one chat room opened by the chat room management unit 130. That is, it may allow a plurality of host to enter one chat room.

The guest information management unit 113 stores information of guests who want to use the location-based hierarchical chat room. Although the guest information management unit 113 may store information of the previously joined guests, it may also be information delivered from a location-based automatic participation chat app executed in the guest terminal 300. That is, the guest information management unit 113 may store, as guest information, information applied from the automatic participation chat app in addition to the individually joined users. The guest information may include an identifier for the guest terminal 300.

When a request for opening a chat room is received together with the service location information from the host terminal 200, the location information determination unit 120 stores the received service location information. At this time, the location information determination unit 120 stores the location information by matching with chat room information generated at the chat room management unit 130. Here, the location information may be offline location information such as GPS information, but in some cases may also be other location information recognition means, for example a network identifier such as WIFI, or the like.

The location information determination unit 120 analyzes the location information applied from the at least one guest terminal 300, based on the guest information stored in the guest information management unit 113. In addition, it determines the location information of the chat room located within a pre-set detection range from the analyzed location of the guest terminal 300. When it is determined that there is a chat room located within the detection range, the location information determination unit 120 transmits the determined location information to the guest terminal 300 and the chat room management unit 130.

In addition, the location information determination unit 120 determines the location of the guest terminal 300 that has entered at least one chat room, and, if it is determined that the guest terminal 300 is out of the service provision range in the location information of the chat room, transmits the location deviation information to the guest information management unit 113 and the chat room management unit 130.

When a request to open a chat room is received together with location information from the host terminal 200 authenticated by the host information management unit 111, the chat room management unit 130 opens at least one chat room. In this case, the chat room management unit 130 may match the information of the opened chat room with the service location information stored in the location information determination unit 120, and store it. In addition, the chat room management unit 130 may check whether a chat room has been previously opened for the same location information, and if there is a chat room already opened in the same location information, notify the existence of the chat room to the host terminal 200.

In addition, when a chat room setting command is applied from the host terminal 200, in response to the chat room setting command, it may create a plurality of chat rooms or hierarchical chat rooms, set and store an identifier for each chat room together.

In addition, the chat room management unit 130 may match to the recognition code of the participation means set in the participation means setting unit 150, and store. That is, the chat room management unit 130 designates the recognition codes of the chat room to be opened and the corresponding participation means.

When a conversation is inputted into the chat window of the host terminal 200 or at least one guest terminal 300, the chat room management unit 130 transmits the conversation to host terminal 200 or at least one guest terminal 300 participating together in the chat room in which host terminal 200 or at least one guest terminal 300 participates that entered the conversation. However, in this embodiment, the chat room management unit 130 analyzes whether a conversation is inputted with the chat room identifier, and, if a conversation is inputted with the chat room identifier, transmits the inputted conversation to host terminal 200 or at least one guest terminal 300 participating in the chat room corresponding to the chat room identifier.

Meanwhile, if the chat room is created as hierarchical chat rooms divided into the upper chat room and lower chat room, the chat room management unit 130 transfers the conversation contents of the lower chat room to another guest terminal 300 entered in the same lower chat room according to the conversation content inputted to the chat window from at least one guest terminal 300. In addition, the chat room management unit 130 determines the corresponding lower chat room according to the conversation content delivered together with the lower chat room identifier, and delivers the conversation content to the guest terminal 300 of the determined lower chat room. In addition, the chat room management unit 130 transmits the conversation contents inputted along with a pre-designated upper conversation command among the inputted conversation contents to the chat room management unit 130, so that the chat room management unit 130 can transmit the conversation content inputted together with the upper conversation command to the host terminal 200.

If the chat rooms to be opened are hierarchical chat rooms, the chat room management unit 130 may be divided into an upper chat room management unit and a lower chat room management unit.

The service menu providing unit 140 may generate and store a service menu screen according to a service menu setting command applied from the host terminal 200. Here, the service menu is information on services that the host can provide to the guest, as described above. Here, the service menu may be set identically to all chat rooms created by the same host, but in some cases may also be set differently for each chat room. That is, the host may provide the same service to all chat rooms, but may also provide different services for each chat room.

When a service menu call command is applied from the guest terminal 300, the service menu providing unit 140 transmits a set service menu screen to the guest terminal 300. Then when a service selection signal is received from the guest terminal 300, it transmits the selected service selection information together with the chat room identifier to the chat room management unit 130, so that the chat room management unit 130 transmits it to the host terminal 200. The service selection information transmitted to the host terminal 200 is displayed together with the chat room identifier in the chat window so that the host can check the service type and the chat room to provide the service.

In addition, if the cost for each service is designated together, the service menu providing unit 140 may calculate the cost for the service used in each guest terminal 300 and transmit it to the chat room management unit 130, so that the cost is displayed on the host terminal 200 and the guest terminal 300. In this case, the service menu providing unit 140 may separately display the service cost selected for each individual guest terminal 300 of the chat room, or may also display the entire cost of using the service in the entire specific chat room. In addition, in some cases, the cost of using the service in the entire chat room may be divided and displayed by the number of guests entering the chat room.

Meanwhile, when a request to pay for service is received from the host terminal 200 or the guest terminal 300, the service menu providing unit 140 transmits the calculated cost to the payment approval unit 160.

In some cases, the service menu providing unit 140 may be configured to be included in the chat room management unit 130 or the chat room management unit 130.

The participation means setting unit 150 matches and stores a participation means for allowing at least one guest terminal 300 to immediately enter a specific chat room and a recognition code for the participation means to the identifier of the corresponding chat room. When the recognition code recognizing the participation means is transmitted from the guest terminal 300, the participation means setting unit 150 allows the chat room management unit 130 to enter the guest terminal 300 into the corresponding chat room, by using the identifier of the chat room matched to the recognition code. Here, the participation means may include a network identifier such as WIFI, a QR code, an NFC tag, or the like, and may also include GPS location information, but is not limited thereto.

If the guest terminal 300 is in a state where the location-based automatic participation chat app is not running, the participation means setting unit 150 transmits a request to execute the app to the guest terminal 300 so that the guest terminal 300 executes the automatic participation chat app.

The participation means setting unit 150 may be configured to be included in the chat room management unit 130.

When the cost calculated from the service menu providing unit 140 is transmitted, the payment approval unit 160 performs payment approval processing on the transmitted cost. The payment approval unit 160 may be configured to directly approve the payment, but as shown in FIG. 2, when a separate payment server 400 exists, may be configured to transmit payment information to the payment server 400 to perform a payment, and to receive the payment approval result.

Figure 4:
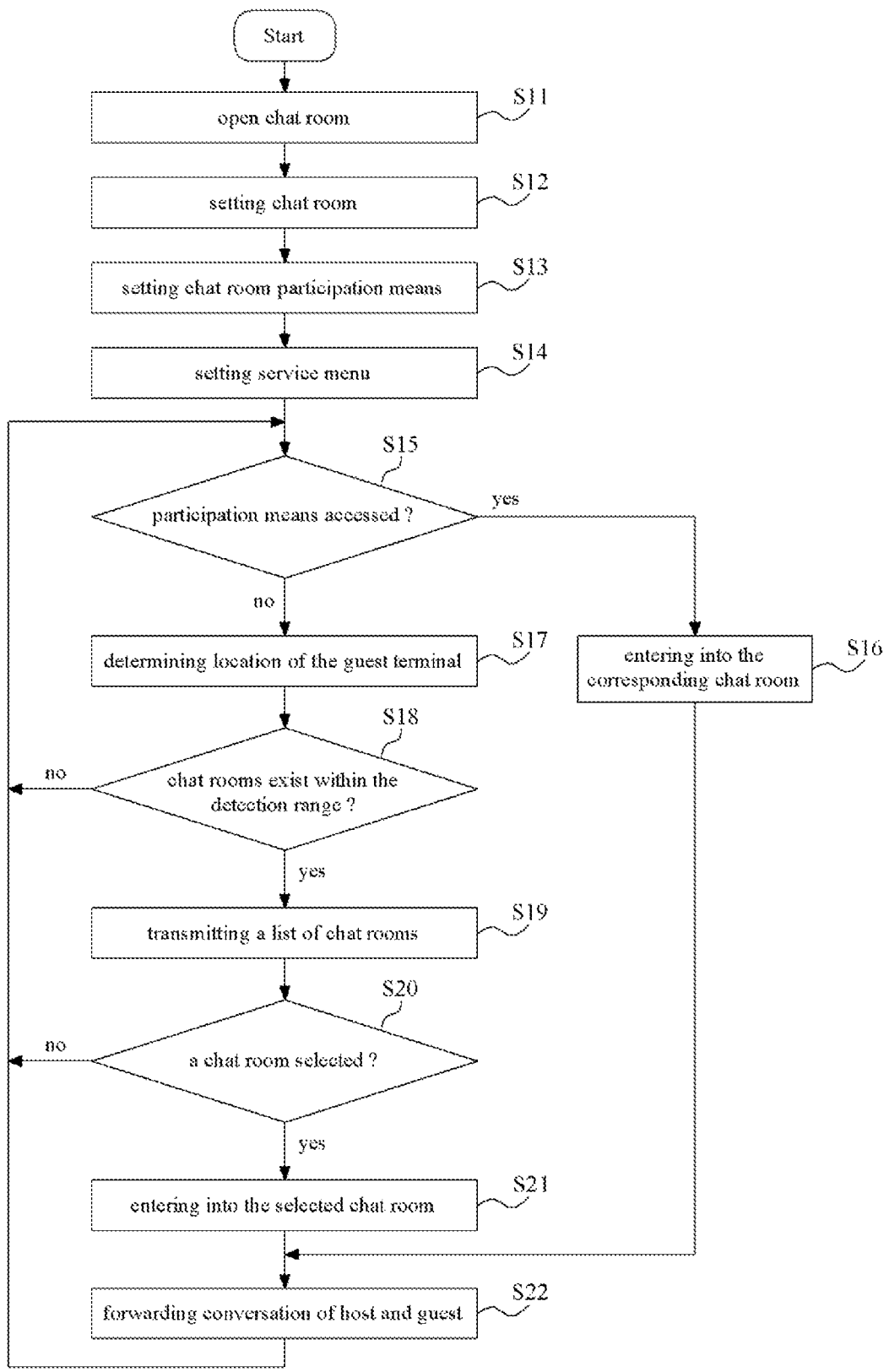
FIG. 4 shows a method for providing a location-based automatic participation chat room according to an embodiment of the present disclosure.

FIG. 4 shows a method for providing a location-based automatic participation chat room according to an embodiment of the present disclosure.

In FIG. 4, a method for providing a location-based automatic participation chat room is described, based on the operation of the chat server that is a device for providing a location-based automatic participation chat room according to the present embodiment.

When a request to open a chat room is received from at least one host terminal 200, the chat server 100 opens a location-based chat room (S11). In this case, the chat server 100 may perform host authentication for the host terminal 200. Then, by matching and storing the service location information applied with the request to open a chat room, it allows to check the offline location information of the chat room to be opened. In addition, if there is a previously opened chat room in response to the transmitted service location information, the chat server 100 may notify the host terminal 200 of this, and then open a chat room.

Here, in the service location information, a service provision range may be set together in which a host can provide a service. The service location information may be location information based on geographic information such as GPS and/or location information based on a wireless network identifier such as WIFI, but is not limited thereto. If the service location information is physical location information based on geographic information, the service provision range may be set to a pre-designated distance range. However, if the service location information is location information based on a wireless network identifier, the service provision range may be set as a virtual range according to whether a wireless network is accessed.

When the chat room is opened, the chat server 100 receives a chat room setting command from the host terminal 200 and stores the chat room setting (S12). Here, the chat room setting can designate the number of chat rooms, identifiers for the chat rooms, and the like. In addition, it can also set up hierarchical chat rooms.

Additionally, the chat server 100 may receive and set together a participation means for each of the at least one chat room from the host terminal 200, and match and store the recognition code included in the participation means to the identifier of the chat room (S13). Here, the participation means may include a network identifier, a QR code or an NFC tag including a recognition code, or the like, and in some cases, GPS location information may also be included.

Then the chat server 100 receives a service menu setting command from the host terminal 200, and sets a service menu for displaying services that the host can provide to the guest (S14). In this case, the chat server 100 may configure and store a service menu screen including a plurality of service menus.

Meanwhile, the chat server 100 determines whether at least one guest terminal 300 accesses by using the participation means or whether the recognition code designated in the participation means is transmitted from the guest terminal 300 (S15). If the guest terminal 300 accesses using the participation means or transmits the recognition code, the chat server 100 directly enters the guest terminal 300 into the chat room corresponding to the participation means (S16). At this time, at least one guest terminal 300 may be in a state in which the location-based automatic participation chat app is not executed, and in this case, the chat server 100 may transmit a request to execute the app to the guest terminal 300 so that the guest terminal 300 executes the automatic participation chat app.

However, if the guest terminal 300 does not use the participation means, the chat server 100 receives and analyzes location information from at least one guest terminal 300 to determine the location of the guest terminal 300

(S17). Then the chat server 100 determines whether the service location information of the previously opened chat room is included within a pre-designated detection range from the location information of the determined guest terminal 300. That is, it determines whether there are opened chat rooms within the detection range from the current location of the guest terminal 300 (S18).

If there are opened chat rooms, a list of chat rooms within the detection range is transmitted to the guest terminal 300 (S19). In this case, the chat server 100 may transmit service location information of the chat room together.

Then it is determined whether a chat room selection signal for selecting a chat room is applied from the guest terminal 300 (S20). If the chat room selection signal is applied, it enters the guest terminal 300 into the selected chat room (S19). That is, it matches the guest terminal 300 to the selected chat room information. At this time, the chat server 100 may additionally transmit a list of at least one lower chat rooms of the selected upper chat room to the guest terminal 300, and if a lower chat room selection signal is applied for the lower chat room list, enter the guest terminal 300 into the lower chat room.

Then when the guest terminal 300 enters the chat room, the chat server 100 delivers the conversation contents of each chat room (S22).

When a conversation is inputted into the chat window of the host terminal 200 or the guest terminal 300, the chat server 100 transmits the conversation to host terminal 200 or at least one guest terminal 300 participating together in the chat room in which the host terminal 200 or the at least one guest terminal 300 participates. However, in this embodiment, the chat room management unit 130 analyzes whether a conversation is inputted with the chat room identifier, and, if a conversation is inputted with the chat room identifier, transmits the inputted conversation to host terminal 200 or at least one guest terminal 300 participating in the chat room corresponding to the chat room identifier.

In addition, if the chat rooms are created as hierarchical chat rooms divided into the upper chat room and lower chat room, the chat server 100 may transmit a conversation between the participants of the upper chat room and the lower chat room. For example, if the host terminal 200 participates in the upper chat room and the guest terminal 300 participates in the lower chat room, when a conversation is entered in the chat window of the host terminal 200, the chat server 100 transmits it to other host terminals 300 included in the upper chat room. In addition, it transmits the conversation content inputted to the chat window of each guest terminal 300 entering the lower chat room to the guest terminals 300 included in the lower chat room.

However, when a conversation is inputted with a pre-designated upper conversation command in the chat window of the guest terminal 300, it transmits the inputted conversation to the host terminal 200 of the upper chat room. Meanwhile, when a conversation is inputted with the identifier of the lower chat room in the chat window of the host terminal 100 of the upper chat room, it transmits the inputted conversation to the guest terminals of the lower chat room.

That is, the chat server 100 filters the identifier of the chat room, the upper conversation command, or the like in the conversation inputted to the chat window, and if it is determined that the identifier of the chat room or the upper conversation command is included in the conversation, transmits the corresponding conversation to the chat room that corresponds to the identifier of the chat room or upper conversation command. Accordingly, it allows the host terminal 200 of the upper chat room and the guest terminal 300 of the lower chat room to freely transmit conversations to the upper chat room or the lower chat room without changing chat windows.

Figure 5:
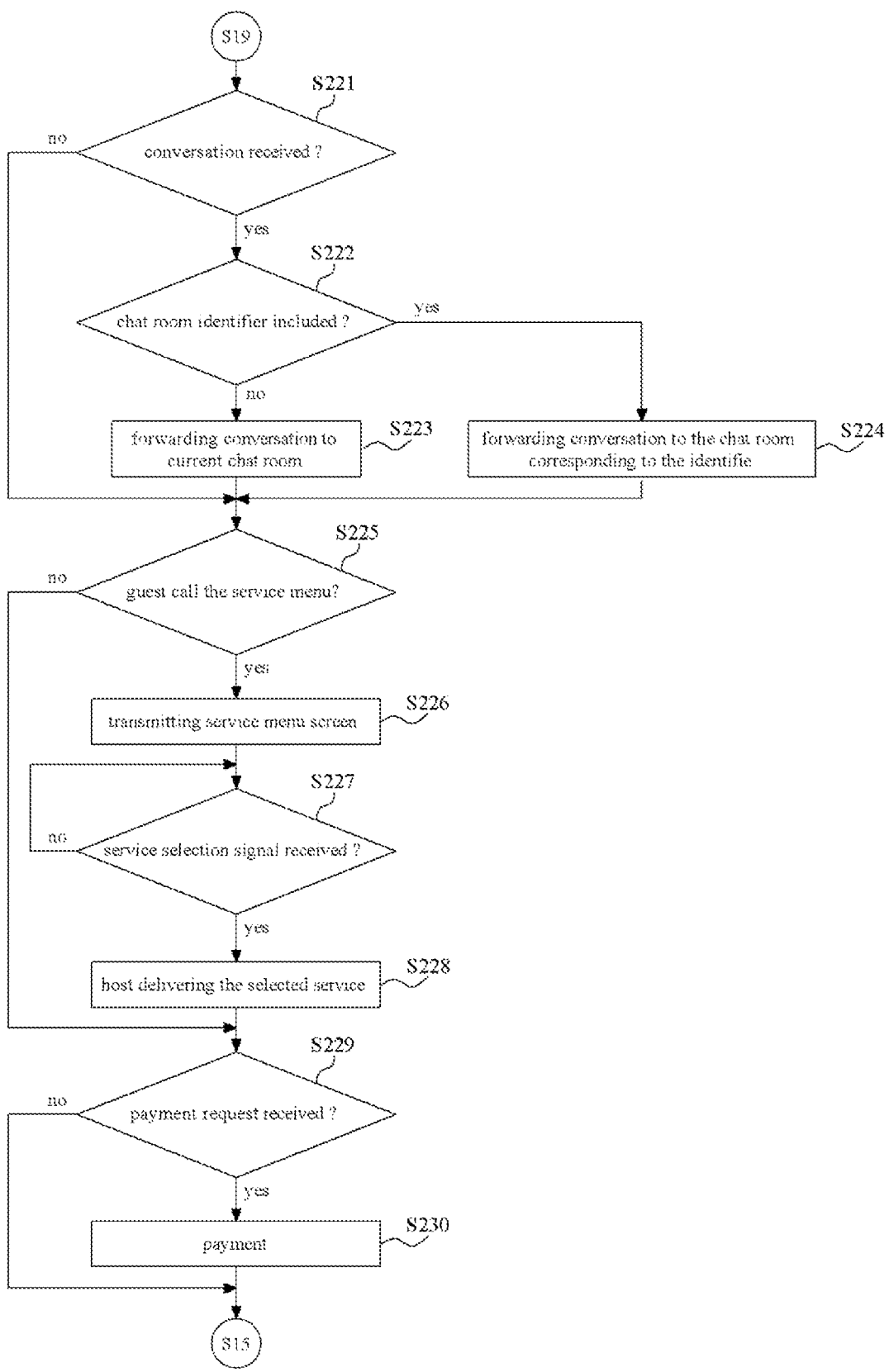
FIG. 5 shows in detail a step of transmitting the host and guest conversation of FIG. 4.

FIG. 5 shows in detail a step of transmitting the host and guest conversation of FIG. 4.

Referring to FIG. 5, in the step of transmitting the host and guest conversation (S22), the chat server 100 determines whether a conversation is received from at least one host terminal 200 or a guest terminal 300 (S221). If a conversation is received, it filters the received conversation and determines whether a pre-designated chat room identifier or upper conversation command is included (S222). Here, the upper conversation command may be, for example, a designated character (eg, !, ^, &, etc.) placed at the beginning of a conversation sentence. If it is determined that the pre-designated chat room identifier or upper conversation command is not included, the chat server 100 transmits the received conversation to another host terminal 200 or guest terminal 300 in the same chat room (S223). However, if it is determined that the chat room identifier or the upper conversation command is included, it transmits the received conversation to at least one host terminal 200 or guest terminal 300 of the chat room corresponding to the chat room identifier or the upper chat room (S224).

Then the chat server 100 determines whether a service menu call command is received from at least one guest terminal (S225). If the service menu call command is received, the chat server 100 transmits the service menu screen set and stored by the host terminal 200 to the guest terminal 300 (S226).

Then it determines whether a service selection signal is received from the guest terminal 300 to which the service menu screen was transmitted (S227). When the service selection signal is received from the guest terminal 300, the chat server 100 transmits the selected service together with the identifier of the chat room to the host terminal 200 so that the host can provide the service to the guest (S228).

In addition, the chat server 100 determines whether a payment request is received from at least one host terminals 200 or at least one guest terminal 300 (S229). When a payment request is received, the chat server 100 settles costs for the service used by the guest (S230). At this time, the chat server 100 may individually settle costs of using the chat room services for each guest terminal 200, or may also collectively settle costs used by the entire chat room through a specific guest terminal 300 or host terminal 200.

Although not shown, if it is determined that at least one guest terminal 300 entering the lower chat room is out of the service provision range, the chat server 100 may exclude the corresponding guest terminal from the chat room. In addition, if it is determined that all guest terminals of the chat room are out of the service provision range, it may initialize the chat room so that subsequent conversations in the chat room are not transmitted to the guest terminals outside the service provision range.

FIG. 6 to FIG. 18 show actual operation examples of a device and method for providing a location-based automatic participation chat room according to an embodiment of the present disclosure.

In FIG. 6 to FIG. 18, it is assumed that the chat rooms are set as hierarchical chat rooms including one upper chat room and a plurality of lower chat rooms, and the host terminal 200 is assumed to participate in the upper chat room.

In FIG. 6 to FIG. 18, the left window is a chat window of the host terminal 200, and it is assumed that the host terminal 200 is, for example, a terminal disposed on a counter in a restaurant. The remaining three windows are chat windows of the guest terminals, respectively. In addition, it is assumed that the left two of the three chat windows of the guest terminals are chat windows for the guest terminals of the party who seats at table No. 1 of the restaurant afterward, and the right chat window is a chat window for a guest terminal of an individual guest.

Figure 6:
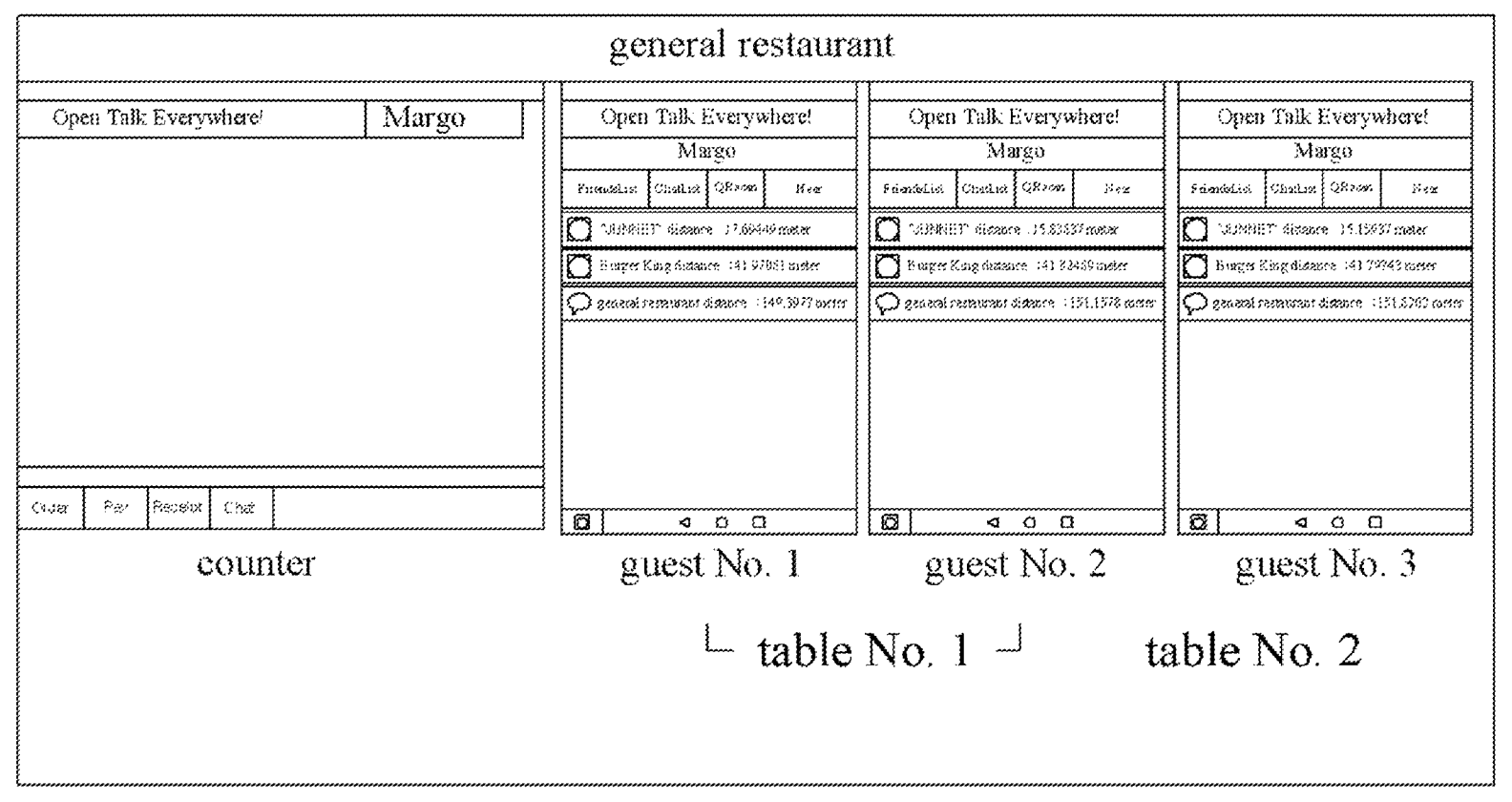

Referring to FIG. 6 first, the chat server 100 transmits, to each guest terminal 300, a list of chat rooms that exist within a detection range from the current location of the guest terminal 300 in which the location-based hierarchical chat room app is executed and the chat window is opened. In FIG. 6, all three guest terminals 300 are located adjacent to each other, and it can be seen that the same list of chat rooms is transmitted to all three guest terminals 300.

In addition, as shown in FIG. 6, when transmitting a list of chat rooms, the chat server 100 may transmit distance information from the current location of the guest terminal 300 to the location of the chat room together.

FIG. 7 shows a state in which each guest terminal 300 enters a chat room using a participation means arranged at each table of a restaurant. In FIG. 7, as an example, it is shown that, among the three guest terminals, the first and second guest terminals are in a state of entering the same first lower chat room using the participation means arranged on table No. 1, and the third guest terminal is in a state of entering the second lower chat room using the participation means arranged on table No. 2.

In addition, as shown in FIG. 7, the chat window according to an embodiment of the present disclosure does not only provide a screen for chatting, but may further include a service menu screen for ordering (Order), an order and payment screen (Pay), a payment approval history screen (Receipt), and the like. At this time, according to the chat room setting applied at the host terminal 200, even if the service menu call command of the guest terminal is not applied, when a guest terminal enters the lower chat room, the chat server 100 may transmit the service menu screen first, as shown in FIG. 7.

Figure 8:
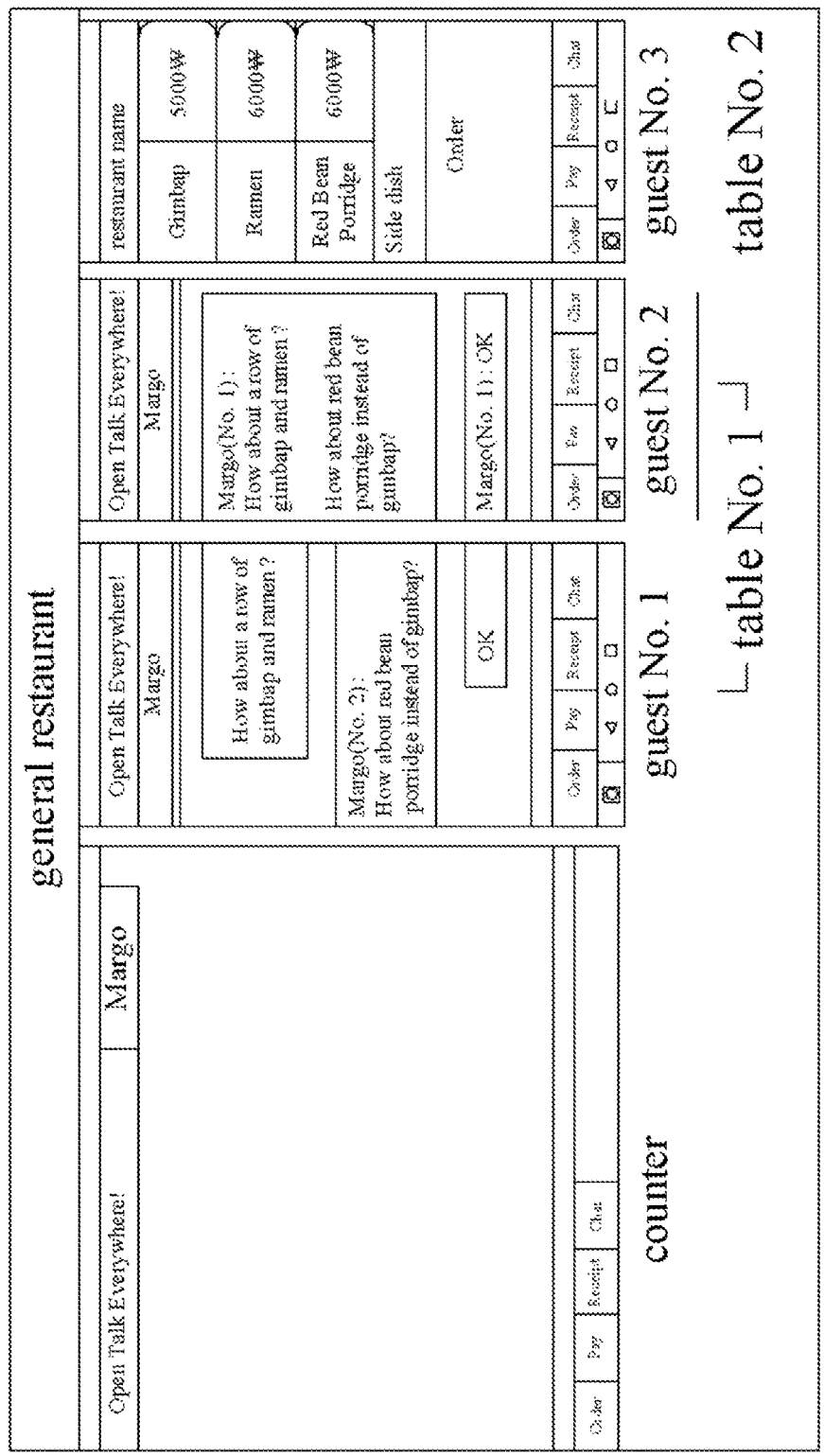

FIG. 8 shows a process in which the guests of the first lower chat room of table No. 1 transmit a conversation through the chat window. As shown in FIG. 8, conversations between the guest terminals of the lower chat room are mutually transmitted only to the guest terminals in the lower chat room, and are not transmitted to the host terminal of the counter or the guest terminal of the second lower chat room.

FIG. 8 shows a state in which guests of the first lower chat room of table No. 1 have selected specific services on the service menu screen. The service selected on the service menu screen is transmitted to the chat server 100 as a service selection signal, and, in response to the service selection signal, the chat server 100 may configure an order and payment screen (Pay) and transmit it to the guest terminal 300. In this case, the chat server 100 may collectively display the services selected in each guest terminal, as shown in FIG. 9.

However, as in the guest terminal indicated as the guest No. 1 of FIG. 10, it may further provide a screen that distinguishes and displays the services selected in each guest terminal.

FIG. 11 shows a state in which the third guest terminal in Table No. 2 selects a service.

However, in FIG. 9 to FIG. 11, the selection of the service is not yet completed, and thus any conversation or selected service menu is not displayed in the chat window of the host terminal 200 of the counter.

Meanwhile, FIG. 12 shows a state in which the selection has been completed for the service menu selected by the first guest terminal of the first lower chat room, that is, the order is performed. As shown in FIG. 12, even if a plurality of guest terminals select different service menus in one lower chat room, one guest terminal may collectively select all the selected service menus. Then, as the service selection of the lower chat room is completed, the selected service details together with the lower chat room identifier (here, table No. 1) are displayed in the chat window of the host terminal 200 of the upper chat room.

Figure 13:
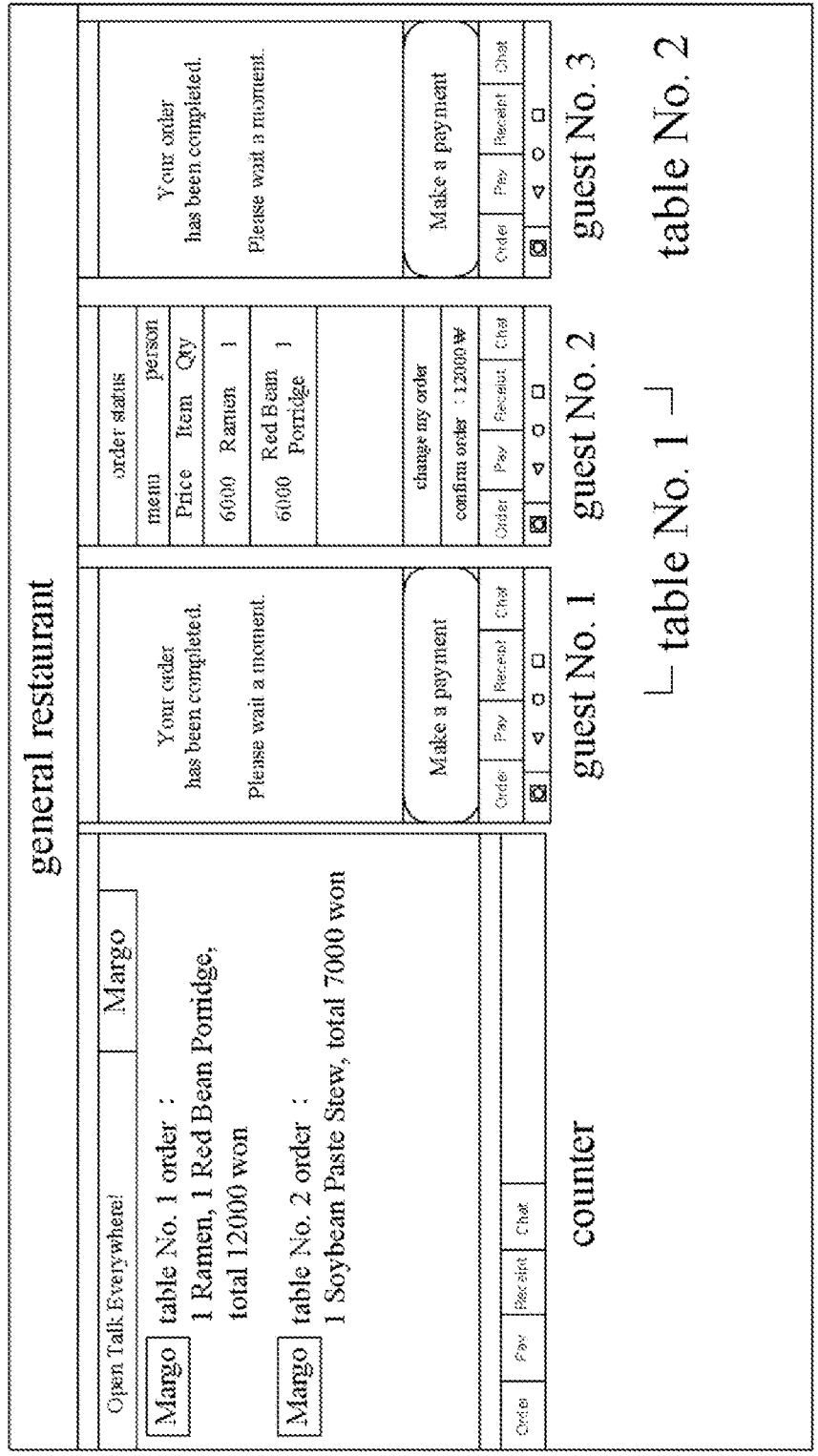

FIG. 13 shows a state in which the third guest terminal in Table No. 2 has completed the service selection, and the selected service details along with the lower chat room identifier (here, table No. 2) are displayed in the chat window of the host terminal 200 of the upper chat room.

Figure 14:
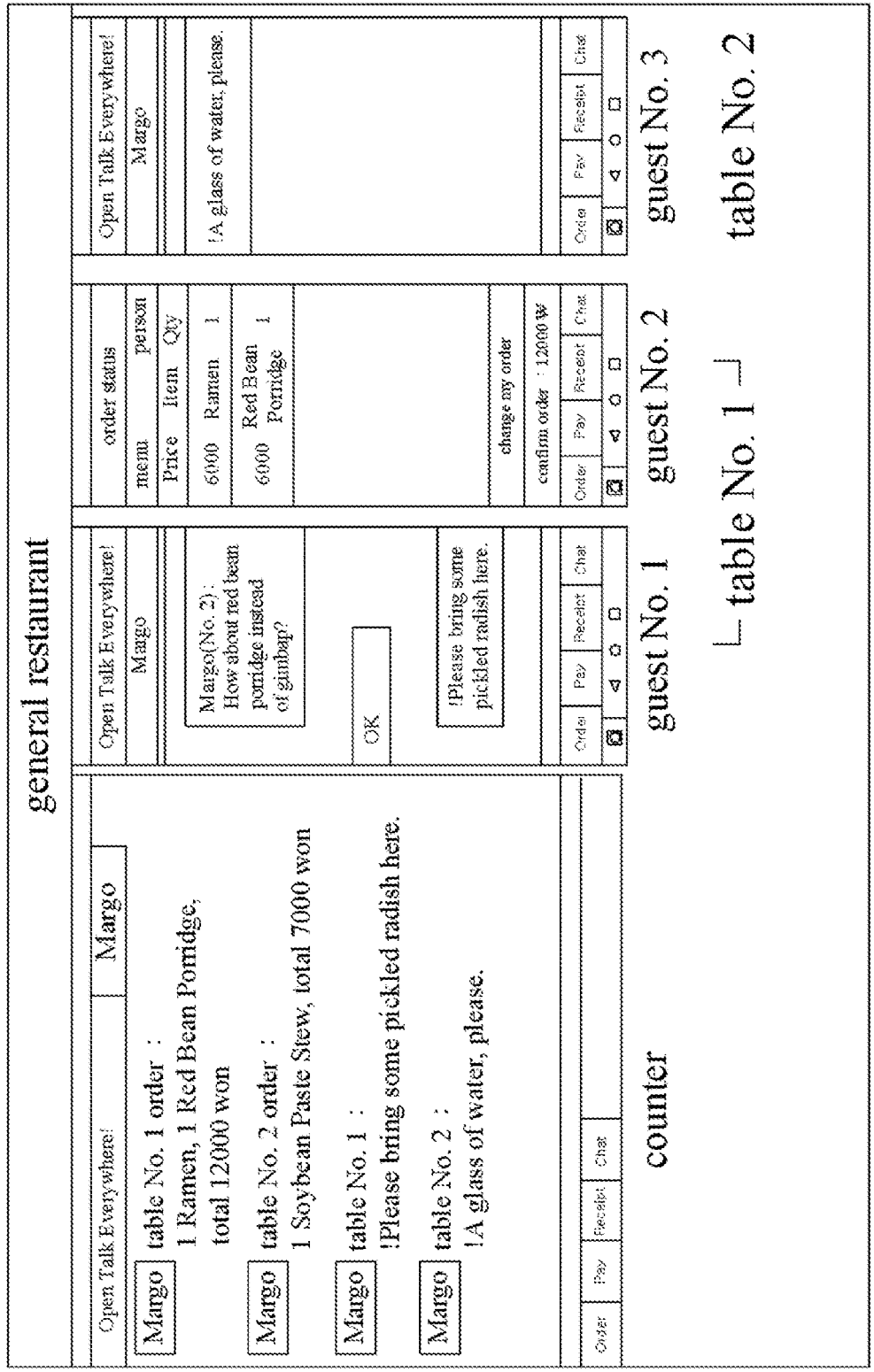

FIG. 14 shows a process in which guest terminals of lower chat rooms perform a conversation with a host terminal of the upper chat room. Referring to FIG. 14, the guest terminals of each of the first and second lower chat rooms inputted a conversation in the chat window of the lower chat room, wherein they inserted the pre-designated upper conversation command "!" into the front of the conversation. Due to this, the chat server 100 recognizes that the conversation inputted from the guest terminal is a conversation to be transmitted to the upper chat room, and delivers the applied conversation to the host terminal 200.

Figure 15:
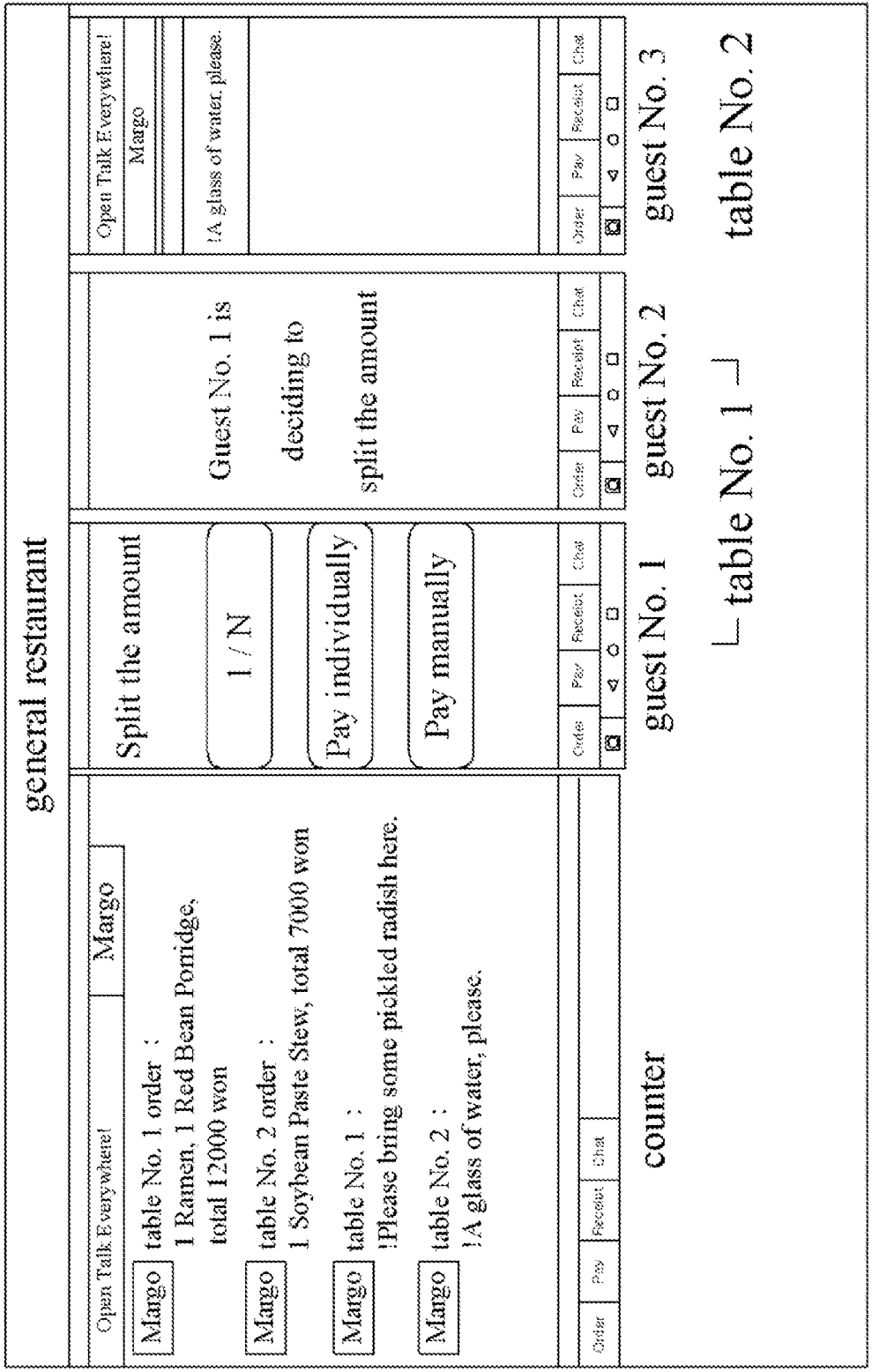

FIG. 15 and FIG. 18 show a process in which the guest terminal of the first lower chat room selects a payment method through the order and payment screen (Pay) and performs payment. Referring to FIG. 15, it can be seen that, as in the order, one guest terminal among a plurality of guest terminals in the lower chat room can determine whether to divide the cost for the service used in the corresponding lower chat room. In this case, the guest terminal may select one of several pre-designated payment amount dividing methods, and notify the remaining guest terminals of the lower chat room.

If the guest terminal selects 1/N dividing method, each guest terminal of the lower chat room may perform payment for the same amount by selecting one of several payment methods, as shown in FIG. 16.

Then, when the payment is requested and approved, the payment approval details are also transmitted and displayed on the host terminal 200.

In the above FIG. 6 to FIG. 18, it is assumed that the device and method for providing a location-based automatic participation chat room according to the present embodiment is applied to a restaurant, but the present disclosure is not limited thereto.

As a result, the device and method for providing a location-based automatic participation chat room according to an embodiment of the present disclosure allows the guest terminal to easily participate in a specific chat room and perform chatting. In addition, while performing chatting in a chat room in which the host terminal and the guest terminal participated, respectively, it allows chatting to be performed in the same chat window beyond the division of chat rooms, by performing a conversation with a simple command such as a chat room identifier or a upper conversation command. In addition, the convenience of guests can be maximized by receiving service menus, ordering services, and even processing payment for the services at the chat window.

The method according to embodiments of the present disclosure may be implemented as a computer program stored in a medium for executing the method in a computer. In this case, the computer-readable medium may be accessible by a computer, and may include all suitable computer storage media. Examples of such computer storage media include all of volatile and nonvolatile media and separation type and non-separation type media implemented by a given method or technology for storing information, such as a computer-readable instruction, a data structure, a program module or other data, and may include a read only memory (ROM), a random access memory (RAM), a compact disk (CD)-ROM, a digital video disk (DVD)-ROM, a magnetic tape, a floppy disk, and an optical data storage device.

The present disclosure has been illustrated and described in connection with various embodiments, but the embodiments are merely exemplary. A person having ordinary skill in the art to which the present disclosure pertains will understand that various modifications and other equivalent embodiments are possible from the embodiments.

Accordingly, the present invention encompasses all variations that fall within the scope of the claims.

What is claimed is:

1. A device for providing a location-based automatic participation chat room comprising:
    a processor; and
    a memory storing instructions that, when executed by the processor, cause the device to:
    when a request to open a chat room is received along with service location information from at least one host terminal, create at least one chat room, and set a chat room identifier and a recognition code corresponding to each of the at least one chat room,
    when at least one guest terminal accesses a location corresponding to the service location information using a pre-set participation means or the recognition code included in the participation means is received, make the guest terminal participate in the chat room corresponding to the recognition code,
    when a conversation is transmitted from at least one guest terminal or host terminal, filter whether the chat room identifier is included,
    if the chat room identifier is not included, forward the transmitted conversation to other guest terminals and host terminals participated in the same chat room,
    if the chat room identifier is included, forward the transmitted conversation to other guest terminals and host terminals participated in the chat room corresponding to the chat room identifier,
    in response to a service menu setting command applied from the host terminal, additionally create and store a service menu screen to be transmitted to the guest terminal,
    when a service menu call command is applied from the at least one guest terminal, deliver the service menu screen including at least one service information, and
    when a service selection signal for at least one service included in the service menu screen is received from the at least one guest terminal, deliver the selected service information together with the chat room identifier to the host terminal.

2. The device according to claim 1, wherein the instructions, when executed by the processor, cause the device to,
    when a chat room setting command is applied together with a chat room opening request from the at least one host terminal, creates a plurality of chat rooms in response to the chat room setting command, or creates hierarchical chat rooms including an upper chat room and at least one lower chat rooms corresponding to the upper chat room, and designates the chat room identifier and the recognition code corresponding to each of the created chat rooms.

3. The device according to claim 2, wherein the instructions, when executed by the processor, cause the device to:
    when a conversation is transmitted from at least one guest terminal or host terminal participating in the lower chat room, filters whether a pre-designated upper conversation command is included,
    if the conversation command is not included, forwards the transmitted conversation to other guest terminals and host terminal participated in the same chat room, and
    if the conversation command is included, forward the transmitted conversation to other guest terminals and host terminal participated in the upper chat room.

4. The device according to claim 1, wherein the instructions, when executed by the processor, cause the device to:
    receive location information of each of the at least one guest terminal, determine whether the service location information is included within a pre-designated detection range from the received location information, deliver a chat room list for a chat room corresponding to the determined service location information to the at least one guest terminal, and
    when a selection signal for a chat room of the chat room list is received from the at least one guest terminal, make the guest terminal participate in the selected chat room.

5. The device according to claim 1, wherein the instructions, when executed by the processor, cause the device to,
    when a payment request is received from the at least one guest terminal, settle costs corresponding to the selected service information.

6. The device according to claim 5, wherein the instructions, when executed by the processor, cause the device to:
    when a payment request is received from the at least one guest terminal, transmit a cost dividing method selection screen displaying at least one cost dividing methods to the guest terminal, and
    divide the cost according to the cost dividing method selected by the guest terminal, transmit the divided cost to the guest terminal of the chat room in which the guest terminal participates, and individually settle the cost for each guest terminal of the chat room.

7. The device according to claim 1, wherein the instructions, when executed by the processor, cause the device to:
    when at least one guest terminal participating in the chat room deviates from a service provision range designated for each of the chat rooms, exclude the deviated guest terminal from the chat room, and
    if all guest terminals participating in the chat room deviate from the service provision range, initialize the chat room.

8. The device according to claim 1, wherein the participation means includes at least one of a network identifier, a QR code or an NFC tag including the recognition code, or GPS location information.

9. The device according to claim 1, wherein the service location information includes at least one of GPS information or network information.

10. A method for providing a location-based automatic participation chat room, the method comprising the steps of:
    when a request to open a chat room is received along with service location information from at least one host terminal, creating at least one chat room and setting a chat room identifier and a recognition code corresponding to each of the at least one chat room by a chat server;
    when at least one guest terminal accesses a location corresponding to the service location information using a pre-set participation means, or when a recognition code is received from the at least one guest terminal, making the guest terminal participate in a corresponding chat room among the at least one chat room; and transmitting a conversation inputted to the at least one host terminal or a conversation inputted to the at least one guest terminal, wherein the step of transmitting a conversation comprises the steps of:

when a conversation is transmitted from the at least one guest terminal or host terminal, filtering whether the chat room identifier is included;
  if the chat room identifier is not included, forwarding the transmitted conversation to other guest terminals and host terminals participated in the same chat room, and
  if the chat room identifier is included, forwarding the transmitted conversation to other guest terminals and host terminals participated in the chat room corresponding to the chat room identifier, wherein the method further comprises the steps of:

in response to a service menu setting command applied from the host terminal, additionally creating and storing a service menu screen to be transmitted to the guest terminal;

when a service menu call command is applied from the at least one guest terminal, delivering the service menu screen including at least one service information; and when a service selection signal for at least one service included in the service menu screen is received from the at least one guest terminal, delivering the selected service information together with a lower identifier to the host terminal.

11. The method for providing a location-based automatic participation chat room according to claim 10, wherein the step of setting a recognition code comprises the steps of:
  when a chat room setting command is applied together with a chat room opening request from the at least one host terminal, creating a plurality of chat rooms in response to the chat room setting command, or creating hierarchical chat rooms including an upper chat room and at least one lower chat room corresponding to the upper chat room, and designating the chat room identifier and the recognition code corresponding to each of the created chat rooms.

12. The method for providing a location-based automatic participation chat room according to claim 11, wherein the step of transmitting a conversation comprises the steps of:
  when the conversation is transmitted from the at least one guest terminal or host terminal participating in the lower chat room, filtering whether a pre-designated upper conversation command is included;
    if the conversation command is not included, forwarding the transmitted conversation to other guest terminals and host terminal participated in the same chat room; and
    if the conversation command is included, forwarding the transmitted conversation to other guest terminals and host terminal participated in the upper chat room.

13. The method for providing a location-based automatic participation chat room according to claim 10, wherein the method further comprises the steps of:
  receiving location information of each of the at least one guest terminal, and determining whether the service location information is included within a pre-designated detection range from the received location information;
  delivering a chat room list for chat rooms corresponding to the determined service location information to the at least one guest terminal; and
  when a selection signal for a chat room of the chat room list is received from the at least one guest terminal, making the guest terminal participate in the selected chat room.

14. The method for providing a location-based automatic participation chat room according to claim 10, wherein the method further comprises the step of:
  when a payment request is received from the at least one guest terminal, settling costs corresponding to the selected service information.

15. The method for providing a location-based automatic participation chat room according to claim 10, wherein the method further comprises the steps of:
  when at least one guest terminal participating in the chat room deviates from a service provision range designated for the chat room, excluding the deviated guest terminal from the chat room; and
  when all guest terminals participating in the chat room deviate from the service provision range, initializing the chat room.

\* \* \* \* \*